July 28, 1953 J. H. WEAVING ET AL 2,646,991
MOTOR ROAD VEHICLE TORSION RESISTANT CHASSIS
Filed April 12, 1950 2 Sheets-Sheet 1
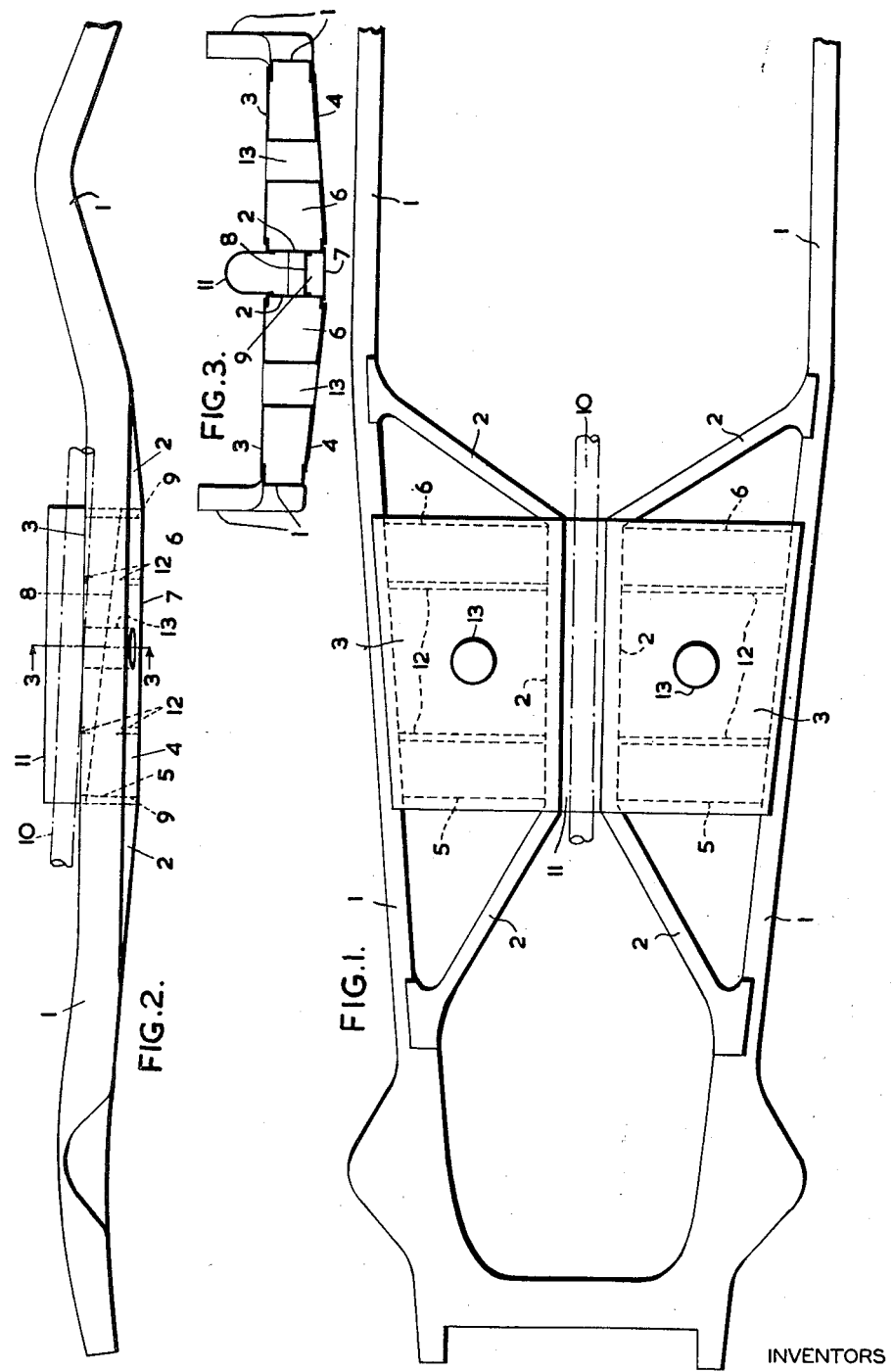
INVENTORS
JOHN HAROLD WEAVING
KENNETH JOHN DANGERFIELD
THOMAS KENNETH GARRETT
BY
A. Yates Dowell
ATTORNEY Patented July 28, 1953

2,646,991

UNITED STATES PATENT OFFICE 2,646,991

MOTOR ROAD VEHICLE TORSION RESISTANT CHASSIS

John H. Weaving, Moseley, Birmingham, Kenneth J. Dangerfield, Selly Oak, Birmingham, and Thomas K. Garrett, Rubery, near Birmingham, England, assignors to The Austin Motor Company Limited, Northfield, Birmingham, England Application April 12, 1950, Serial No. 155,426
In Great Britain April 21, 1949

7 Claims. (Cl. 280—106)

This invention relates to motor road vehicles, the chief object being to provide new or improved means for considerably increasing the torsional stiffness of the vehicle chassis or body without unduly increasing the weight of the structure.

The conventional chassis of a motor road vehicle has comparatively little strength in torsion, its torsional resistance being afforded by the torsional stiffness of the chassis side members together with the bending stiffness of a cruciform bracing.

Though it is generally appreciated that it is desirable that either the chassis or the body, or the chassis and body jointly, should exhibit high torsional rigidity about a longitudinal horizontal axis, this has been difficult to attain, because of the obstruction afforded by the engine gearbox and transmission which generally lie in the longitudinal medial plane of the vehicle.

According to the invention, there is incorporated either in the chassis or the body, or both, one or more hollow torsion members which is or are transversely arranged and so connected to the structure as to increase the torsional resistance thereof about a longitudinal horizontal axis and thereby resist twist set up by road undulations on separate road wheels. The disposition of the transverse hollow torsion members is such as not to interfere with engine gearbox and transmission.

In an application of the invention to the chassis of a motor vehicle the hollow torsion member may be in the form of a box conveniently disposed across the middle of the chassis, and to the rear of the engine and gearbox and either above or below the propeller shaft. The torsion box has a torsional resistance about a transverse horizontal axis and this is transferred to the longitudinal side members of the chassis by direct connection, and preferably also by forwardly and rearwardly extending bracing members, so as materially to increase the torsional resistance of the chassis as a whole about a longitudinal horizontal axis.

In the application of the invention to the vehicle body, one or more transverse torsion boxes of rectangular cross section may be connected across the middle part of the body between the sills, said box or boxes conveniently being in the seat position or positions and constituting supports for the seating. Alternatively or in addition, a transverse torsion box may be provided by or between the usual dash and facia plates, stiffening members which extend down the dash sides to the sills being provided. As a further addition or alternative, a transverse torsion box may be formed by the luggage boot of the vehicle.

The invention will now be more fully described with reference to the embodiments shown in the accompanying drawings, in which:

Figs. 1, 2 and 3 show an application of the invention to a vehicle chassis, Fig. 1 being a plan view, Fig. 2 a side elevation and Fig. 3 a sectional end elevation taken on the line 3, 3, of Fig. 2.

Figure 4:
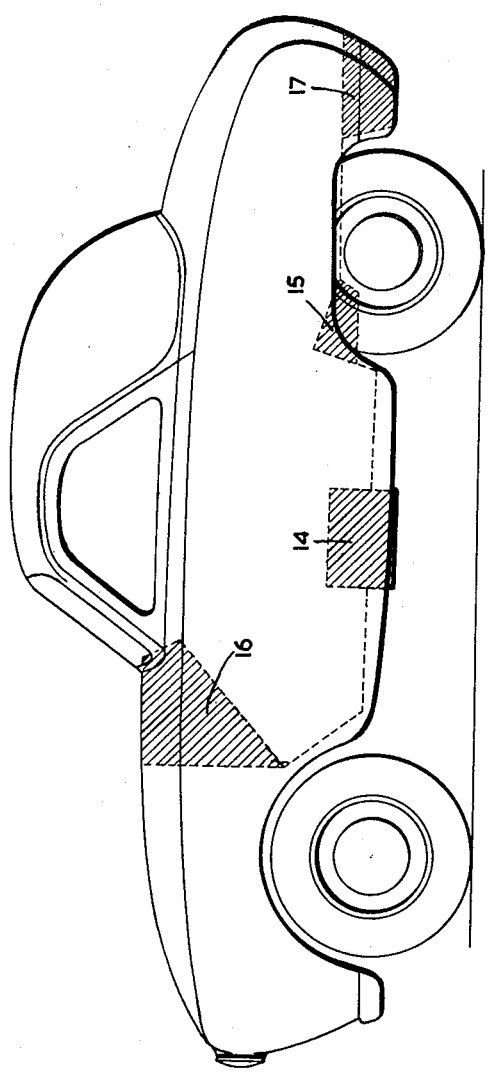
Fig. 4 is a side elevation of a motor car and showing, by means of cross-hatched areas, the various locations in which transverse torsion boxes may be secured in the body structure to increase its torsional resistance to twisting.

Referring to Figs. 1, 2 and 3 of the drawings, the side members 1 of the chassis frame are of channel section with their open sides presented inwardly and there are two channel section bracing members 2 which are "bow-shaped" in plan and have their opposite ends connected, preferably by welding, to spaced points on the chassis side members 1. These two bow-shaped bracing members 2, connected each to one of the chassis side members 1, are disposed in the general plane of the chassis and their centre portions are straight and extend longitudinally on opposite sides of the center line of the chassis and for a considerable distance rearwardly from a point immediately behind the engine gear box position. Each channel section bow-shaped bracing member 2 has its open side confronting that of the chassis member 1 to which its opposite ends are secured.

The center straight part of each bracing member 2 is connected by top and bottom plates 3, 4, respectively to the confronting portion of the associated chassis side member 1 and over a corresponding length, the inner and outer edges of the plates 3, 4 being welded to the corresponding flanges of these members, whilst the space between each pair of top and bottom plates 3, 4 is closed at the front and rear ends by vertically disposed plates 5, 6 respectively, which end plates 5, 6 are welded in position.

The space between the center straight portions of the two bracing members 2 is bridged by a plate 7, which is welded to their bottom flanges, and also, at a somewhat higher position, by a rearwardly and downwardly inclined plate 8 which is welded to the vertical webs of the bracing members 2, these two bridging plates 7, 8 extending throughout the length of the straight center portions of the bracing members 2. The ends of the space defined between the upper and lower bridging plates 8, 7 and the webs of the bracing members 2 are closed by end plates 9 which are welded in position. The space above the bridging plate 8 and between the webs of the bracing members 2 affords a clearance for the propeller shaft 10, indicated in chain lines in Figs. 1 and 2, and this space is covered by a tunnel-like member 11 which is a plate of inverted U-shape in cross section and having its edges welded to the upper parts of the webs of the bracing members 2 throughout the length of the straight center portions thereof.

This construction affords a transverse torsion box extending fully across the chassis and below the propeller shaft 10, the center portions of said box being connected to forward and rearward points on the chassis side members 1 by the end portions of the two bracing members 2 which transfer the torsional strength of said box to the chassis so as to increase very considerably its torsional resistance to distortion under undulating road conditions.

As shown, the torsion box may be additionally stiffened by transverse angle members 12 welded to the top and bottom plates 3, 4; and these plates may also be tensioned by interconnecting tubes 13 disposed vertically and having their end portions welded to said plates. In this connection the plates 3, 4 are formed with openings to receive and fit the ends of the tubes 13 and the plates 3, 4 would be forced or pinched towards one another over the tubes whilst being welded thereto.

Various applications of the invention to a vehicle body are shown in Fig. 4 in which transverse torsion boxes are represented by cross-hatched areas 14, 15, 16 and 17 respectively. The torsion box 14 is of rectangular form and is connected across the middle part of the body between the sills, said box 14 being in the front seat position and constituting a support for said seat (not shown). The torsion box 15 is at the rear seat position and is connected across the body between the rear wheel arches thereof; this box would support the rear seating (not shown). The torsion box 16 is connected across the scuttle between the front bulkhead or scuttle plate and the dash or facia plate, and, if desired, it may be provided with stiffening members (not shown) which extend down the dash sides to the sills. The torsion box 17 is connected across the floor of the boot, between the sides of the body at the rear of the rear wheel arches. The ends of the torsion boxes 14, 15, 16 and 17 are directly connected, preferably by welding, to the respective side wall portions of the body structure so that they stiffen it against twist set up by road undulations without unduly increasing its weight.

It will, of course, be understood that any of the torsion boxes 14, 15, 16 and 17 may be used either alone or in combination as may be found desirable. For example where the chassis is incorporated in the body all four torsion boxes 14, 15, 16 and 17 may be necessary or desirable to obtain the requisite rigidity, whilst where the vehicle has a separate chassis, this may be stiffened by a transverse torsion box, as described with reference to Figs. 1, 2 and 3, and the separately constructed body may then not require to incorporate any or all of the four torsion boxes. In this latter connection it may well be that if the body requires stiffening, the torsion boxes at either or both of the seat positions could be dispensed with, only those across the scuttle and the boot being employed, since the rigidity of the chassis would be imparted to the lower or sill portions of the body.

Having fully described our invention, what we claim and desire to secure by Letters Patent is:

1. A chassis comprising a pair of channel members arranged in spaced face to face relation with the open side of one facing the open side of the other, top and bottom plates connecting the corresponding flanges of the channel members in fixed relation, end walls extending between the channel members and between the plates and secured thereto, said channels, plates, and end walls forming torsion boxes, and means spaced from the end walls and channels engaging the plates and urging the central portions of the plates in opposed directions for stressing the plates and increasing the rigidity of the chassis.

2. A chassis comprising a pair of channel members arranged in spaced face to face relation with the open side of one facing the open side of the other, top and bottom plates connecting the corresponding flanges of the channel members in fixed relation, end walls extending between the channel members and between the plates and secured thereto, said channels, plates, and end walls forming torsion boxes, transverse structural members on said plates for stiffening the same, and means spaced from the end walls and channels engaging the plates and urging the central portions of the plates in opposed directions for stressing the plates and increasing the rigidity of the chassis.

3. A chassis comprising a pair of side members arranged with portions thereof in spaced face to face relation forming side walls, top and bottom wall plates secured to the upper and lower edges respectively of the side members, end walls joining the top and bottom plates and the side members, said top and bottom wall plates, end walls and side members forming a torsion box, and means extending between the plates and spaced from the end walls and side members and urging the central portions of the plates in opposite directions for stressing the plates and increasing the rigidity of the chassis.

4. A chassis comprising a pair of side members arranged with portions thereof in spaced face to face relation forming side walls, top and bottom wall plates secured to the upper and lower edges respectively of the side members, end walls joining the top and bottom wall plates, and the side members, said top and bottom wall plates, end walls and side members forming a torsion box, and means extending between opposite walls of said torsion box and secured thereto urging the central portions of the said opposite walls in opposite directions for stressing the said opposite walls and increasing the rigidity of the chassis.

5. A chassis comprising a pair of side members arranged with portions thereof in spaced face to face relation forming side walls, top and bottom wall plates secured to the upper and lower edges respectively of the side members, end walls joining the top and bottom wall plates and the side members, said top and bottom wall plates, end walls, and side members forming a torsion box, and tubular means extending between opposite walls of said torsion box and secured thereto urging the central portions of the said opposite walls together for stressing the said opposite walls and increasing the rigidity of the chassis.

6. A chassis comprising a pair of side members arranged in spaced face to face relation, a pair of bow-shaped bracing members positioned between the side members with the ends of each bow secured to the corresponding side member and the intermediate portions of the bow-shaped members being spaced apart a sufficient distance to accommodate a propeller shaft, said bow-shaped members being in the same general plane with the side members, top and bottom plates extending between the intermediate portions of each bow-shaped bracing member and the corresponding side member and fixedly secured thereto, end walls extending between and fixedly secured to said top and bottom plates and said side members and said intermediate portions of the bow-shaped members, bridging plates extending between the intermediate portions of the bow-shaped bracing members and secured thereto, interconnecting means extending between said plates and maintaining said plates in stressed condition thereby increasing the rigidity of the chassis.

7. A motor road vehicle chassis, comprising channel section side members with their open sides presented inwardly, two "bow-shaped" bracing members of channel section and disposed longitudinally in the general plane of the chassis and with their open sides presented outwardly, each "bow-shaped" bracing member having a straight center portion and outwardly inclined end portions which are rigidly secured to spaced points on one of the chassis side members so as to span the middle portions of the latter, and a box-like hollow torsion member disposed across the middle of the chassis and comprising top and bottom plates rigidly connected to the confronting flanges of the chassis side members and the straight center portions of the bracing members, upper and lower bridging plates rigidly connected to and interconnecting the straight center portions of the bracing members so as to maintain them in spaced relation and afford between them a clearance for a longitudinally disposed transmission shaft, and plates closing the front and rear sides of the box, said top and bottom plates being stiffened by transverse angle members and tensioned by interconnecting tubes to which they are welded.

JOHN H. WEAVING.
KENNETH J. DANGERFIELD.
THOMAS K. GARRETT.

References Cited in the file of this patent

UNITED STATES PATENTS

| Number | Name | Date |
|---|---|---|
| 1,349,589 | Sweet | Aug. 17, 1920 |
| 1,789,238 | Lancia | Jan. 13, 1931 |
| 1,928,942 | Maddock | Oct. 3, 1933 |
| 2,164,097 | Tjaarda | June 27, 1939 |
| 2,202,859 | Ledwinka | June 10, 1940 |
| 2,212,636 | Dorris | Aug. 27, 1940 |

FOREIGN PATENTS

| Number | Country | Date |
|---|---|---|
| 497,190 | Germany | May 3, 1930 |
| 515,722 | Great Britain | Dec. 12, 1939 |
| 762,366 | France | Jan. 22, 1934 |